United States Patent
Inderka et al.

(10) Patent No.: US 7,759,835 B2
(45) Date of Patent: Jul. 20, 2010

(54) METHOD FOR MANUFACTURING A WINDING FOR A STATOR OF AN ELECTRIC MACHINE

(75) Inventors: Robert Inderka, Birmingham (DE); Franz Nietfeld, Loningen (DE); Jingchuan Li, Troy (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 12/231,991

(22) Filed: Sep. 8, 2008

(65) Prior Publication Data
US 2010/0060098 A1    Mar. 11, 2010

(51) Int. Cl.
*H02K 3/04*    (2006.01)
*H02K 17/00*   (2006.01)
*H02K 27/02*   (2006.01)

(52) U.S. Cl. .................. 310/201; 310/202; 310/203

(58) Field of Classification Search .............. 310/201, 310/202–203
See application file for complete search history.

(56) References Cited

U.S. PATENT DOCUMENTS

| 6,894,412 | B2 | 5/2005 | Cai |
| 6,894,417 | B2 | 5/2005 | Cai |
| 7,462,971 | B2 * | 12/2008 | Koide et al. ............ 310/201 |
| 2007/0170804 | A1 * | 7/2007 | Baumann ............ 310/179 |

* cited by examiner

*Primary Examiner*—Quyen Leung
*Assistant Examiner*—Jose A Gonzalez Quinones
(74) *Attorney, Agent, or Firm*—Klaus J. Bach

(57) ABSTRACT

In a stator for an electric machine and a method for manufacturing a winding for the stator of such an electric machine L-shaped wire segments having a rectangular cross-section are inserted into slots arranged around the stator The long leg of the L-shaped wire segment is then inserted, into or through, a respective slot and the wire segment is then bent into an S-shape resulting in a second short leg while reducing a length of the long leg. The first short leg of each one of a majority of the wire segments is then electrically connected to the first short leg of another one of the wire segments and the second short leg of each one of a majority of the wire segments is electrically connected to the second short leg of yet another one of the wire segments.

14 Claims, 1 Drawing Sheet

METHOD FOR MANUFACTURING A WINDING FOR A STATOR OF AN ELECTRIC MACHINE

BACKGROUND OF THE INVENTION

1. Field of the Invention

The invention relates to a stator for an electric machine and to a method for manufacturing a winding for such a stator.

2. Description of the Background Art

Electric machines are key automotive components. Electric machines may be utilized as starting motors, as alternators that generate electricity from engine motion and as electric drive motors in modern hybrid electric vehicles (HEVs).

The efficiency of an electric machine has a major effect on the fuel economy of hybrid electric vehicles and is also a major issue in other applications. Since the electric machine has to be located 'under the hood' of the vehicle, where space is limited, the size/dimensions of the electric machine must be as small as possible.

Most electric machines include a stator formed from a lamination stack. A plurality of electric conductors, typically in the form of copper wires, is positioned in slots of the stator.

One approach for reducing the size of the electric machine while maintaining or increasing efficiency is to increase the slot-fill ratio of the electric machine. The term "slot-fill-ratio" (SFR) is typically defined as the ratio of the aggregate cross-sectional area of the bare copper conductors in a slot to the cross-sectional area of the slot itself. With a high SFR, the large cross-sectional area of the copper wires helps reduce the phase resistance and consequently the resistance of the windings (i.e.—power loss) for a given slot size, whereby the efficiency of the machine is improved. Today, more efficient electric machines can be built at a smaller size than in the past. Armature windings of most small and mid-sized electric machines are typically wound in many turns with single or multiple strands of round wires. The SFR of the round wire electric machines can reach a maximum of 44% preventing the design of low loss (resistance), high efficiency electric machines. As discussed previously, this issue becomes even more critical when designing high efficiency machines for hybrid vehicles. The available space in onboard hybrid vehicle is strictly limited, and therefore, boosting efficiency by increasing machine size becomes impractical.

One solution for increasing the SFR is to use rectangular wires in the stator slots in place of round wires. Use of rectangular wires in the stator slots can increase the slot-fill-ratio up to 70% over that of round wires, allowing the SFR of rectangular wire machines to reach a value of near 75% or higher.

U.S. Pat. No. 6,894,417 discloses an electric machine having multi-set rectangular copper hairpin windings. The electric machine comprises a stator having a plurality of partially closed stator slots. A first winding set and a second winding set are positioned in the stator slots. The first winding set and the second winding set are interconnected by adjacent leg ends. According to a first embodiment, conductor layers in alternate slots alternate between different phases. The conductor layers in the remaining slots are all of the same phase. Hairpins having unequal length legs are used to implement the first embodiment. According to a second embodiment, conductor layers in alternate slots include one phase for the first winding set and another phase for the second winding set. The conductor layers in the remaining slots are all of the same phase. Hairpins having equal length legs are used to implement the second embodiment.

SUMMARY OF THE INVENTION

It is the principal object of the invention to provide an improved stator for an electric machine and an improved method for manufacturing a winding for such a stator.

In a stator for an electric machine and a method for manufacturing a winding for the stator of such an electric machine L-shaped wire segments having a rectangular cross-section are inserted into slots arranged around the stator, the wire segments having a long leg. The long leg of the L-shaped wire segment is then inserted, into or through, the respective slot, wherein the wire segment is bent into an S-shape resulting in a second short leg while reducing a length of the long leg. The first short leg of each one of a majority of the wire segments is then electrically connected to the first short leg of another one of the wire segments and the second short leg of each one of a majority of the wire segments is electrically connected to the second short leg of yet another one of the wire segments.

A method for manufacturing a winding for a stator of an electric machine according to the invention comprises the steps of inserting a multitude of wire segments having a rectangular cross-section into slots arranged around the stator. The wire segments are first bent into an L-shape resulting in a long leg and in a first short leg. Then the long leg of the L-shaped wire segment is inserted into, or through, the respective slot. After the insertion, the wire segment is bent into an S-shape resulting in a second short leg while reducing the length of the long leg extending through the slot. The first short leg of each one of the majority of the wire segments is then electrically connected to the first short leg of another one of the wire segments. The second short leg of each one of a majority of the wire segments is electrically connected to the second short leg of yet another one of the wire segments. Some of the short legs may be connected to a phase lead or a neutral lead. The advantage of using rectangular wire segments resides in obtaining a higher slot fill ratio (SFR). Compared to hairpin designs, the wire segments do not have to be twisted on one side (in the so-called winding head) so that damages to a conductor insulation are avoided. Also, the L-shaped wire segments are easier to insert into the stator slots. The same connection process may be used for both winding heads, i.e. on both short legs. The winding obtained in this way furthermore has an improved cooling performance compared to round wire windings because of the air gaps among wires at the winding head which increase the wire-cooling surface.

A stator for an electric machine according to the invention has a multitude of slots arranged around the stator. In the slots, a multitude of wire segments with a rectangular cross-section is arranged. The wire segments are bent into an L-shape resulting in a long leg and in a first short. The long leg of the L-shaped wire segment is inserted into or through the respective slot. After the insertion, the wire segment is bent into an S-shape resulting in a second short leg thereby reducing a length of the long leg. The first short leg of each one of a majority of the wire segments is electrically connected to the first short leg of another one of the wire segments. The second short leg of each one of a majority of the wire segments is electrically connected to the second short leg of yet another one of the wire segments.

The wire segments preferably consist of copper. Copper is a material with a very good electrical and heat conductivity. Thus the performance of the electric machine and heat dissipation are optimized.

The short legs may be joined by welding since welding is a very reliable connection technique.

In one embodiment of the invention at least two layers of the winding are arranged in the stator. The short legs of different layers may be connected in lap style or in wave style.

Lap style windings are windings where the short legs of the individual wire segments are connected to the short legs of adjacent wire segments. Wave style windings are windings where the short legs of the individual wire segments are not tied to the short legs of adjacent wire segments, but to the short legs of wire segments which are 180 (electrical) degrees away.

Wire segments of at least two of the layers may be inserted into the same slot.

The stator may be used in an electric machine for automotive use, particularly for a hybrid electric vehicle or a purely electric car.

The invention will become more readily apparent from the following description of preferred embodiments thereof on the basis of the accompanying drawings.

DETAILED DESCRIPTION

Figure 1:
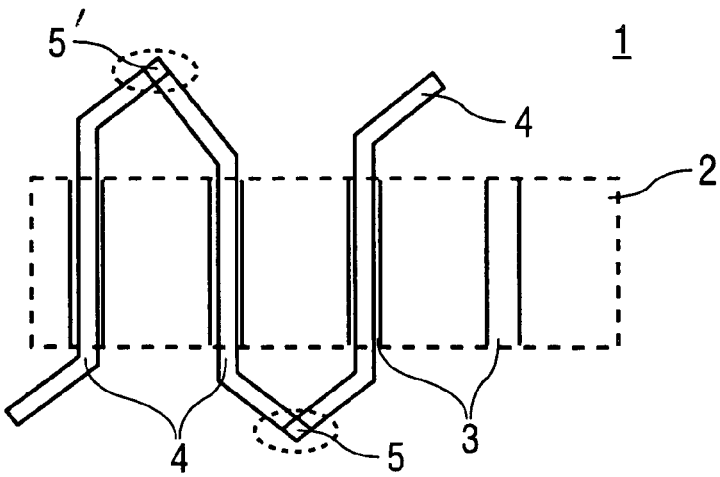
FIG. 1 shows a detail of a stator for an electric machine with a stator core.
Figure 2A:
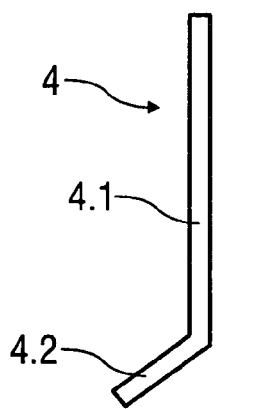
FIGS. 2A and 2B show wire segments comprising long and short legs.
Figure 2B:
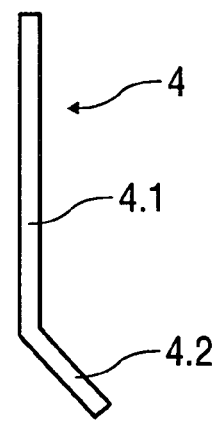
Figure 3A:
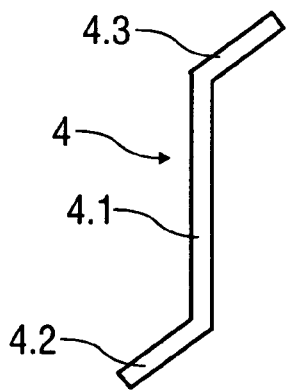
FIGS. 3A and 3B show wire segments with both ends being bent over.
Figure 3B:
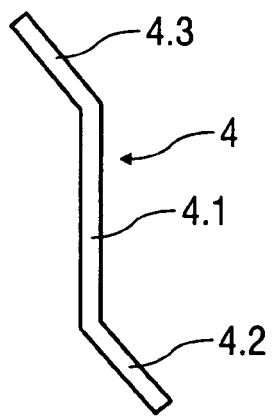

In FIG. 1, a detail of a stator 1 for an electric machine is shown. The stator comprises a stator core 2. In the stator core 2, slots 3 are provided for holding wire segments 4. The wire segments 4 are copper wire segments having a rectangular cross-section. Before being inserted into the slot 3, the wire segment 4 is bent into an L-shape, resulting in a long leg 4.1 and a first short leg 4.2, as shown in FIG. 2A or 2B. In a next step, the long leg 4.1 of the L-shaped wire segment 4 is inserted into, or through, the respective slot 3. After insertion, the wire segment 4 is bent into an S-shape resulting in a second short leg 4.3 while reducing the length of the long leg 4.1, as shown in FIG. 3A or 3B. The first short leg 4.2 of each one of a majority of the wire segments 4 is then connected to the first short leg 4.2 of another one of the wire segments 4 in a connection area 5. The same way the second short leg 4.3 of each one of a majority of the wire segments 4 is then connected to the second short leg 4.3 of another one of the wire segments 4 in a connection area 5'. Some of the short legs 4.2, 4.3 may be connected to a phase lead or a neutral lead (not shown).

The short legs 4.2, 4.3 may be joined by welding.

The stator 1 may be used in an electric machine for automotive applications.

What is claimed is:

1. A method for manufacturing a winding for a stator of an electric machine comprising the steps of: providing a multitude of wire segments having a rectangular cross-section, bending the wire segments into an L-shape so as to form a long leg and a first short leg at a first end of the long leg, inserting the long legs of the L-shaped wire segments into, or through, respective slots in the stator from one end thereof so that the ends of the long legs project from the opposite end of the respective slots, bending over the wire segments projecting from the opposite end such that the wire segments assume an S-shape resulting in a second short leg while reducing the length of the long leg, electrically connecting the first short leg of each one of a majority of the wire segments to the first short leg of another one of the wire segments and the second short leg of each one of a majority of the wire segments to the second short leg of yet another one of the second short legs of the wire segments.

2. The method according to claim 1, wherein the wire segments consist of copper.

3. The method according to claim 1, wherein the short legs are joined by welding.

4. The method according to claim 1, wherein at least two layers of winding are arranged in the stator.

5. The method according to claim 4, wherein the short legs of different layers are connected in lap style.

6. The method according to claim 4, wherein the short legs of different layers are connected in a wave form.

7. The method according to claim 4, wherein wire segments of at least two of the layers are inserted into the same slot.

8. A stator for an electric machine having a multitude of slots arranged around the stator, and a multitude of wire segments having a rectangular cross-section arranged in the slots, the wire segments being bent into an L-shape resulting in a long leg and in a first short leg, the long leg of the L-shaped wire segment extending through the slots and projecting from the respective slot at the opposite end of the stator and bent into an S-shape resulting in a second short bent-over leg while providing a reduced length long leg, the first short leg of each one of a majority of the wire segments being electrically connected to the first short leg of another one of the wire segments and the second short leg of each one of a majority of the wire segments being electrically connected to the second short leg of yet another one of the wire segments.

9. The stator according to claim 8, wherein the wire segments consist of copper.

10. The stator according to claim 8, wherein the short legs are joined by welding.

11. The stator according to claim 8, wherein there are at least two layers of the winding.

12. The stator according to claim 11, wherein the short legs of different layers are joined in lap style.

13. The stator according to claim 11, wherein the short legs of different layers are joined in wave style.

14. The stator according to claim 11, wherein wire segments of at least two of the layers are arranged in the same slot.

* * * * *